UNITED STATES PATENT OFFICE.

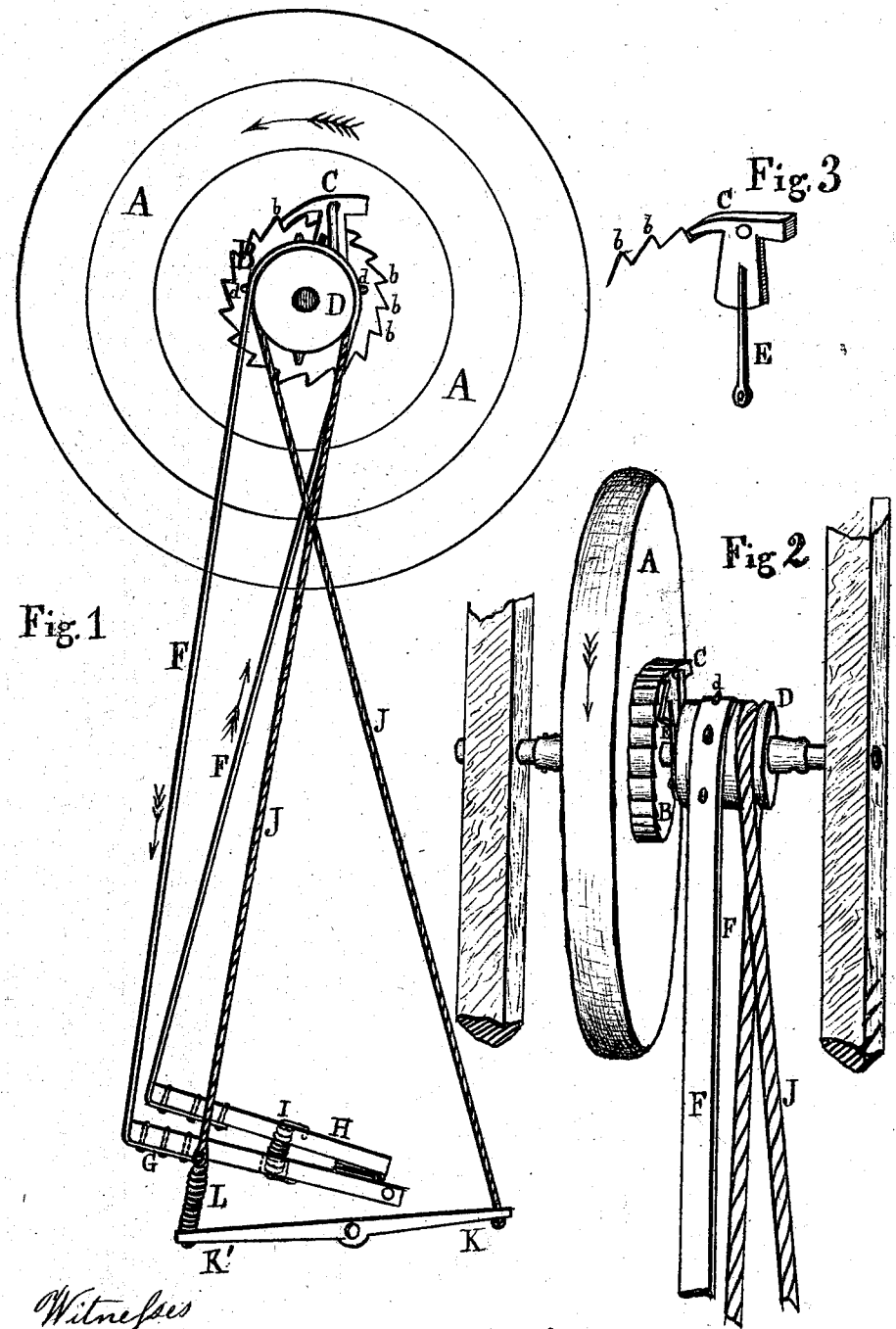

GEORGE BYRON KIRKHAM, OF NEW YORK, N. Y.

IMPROVEMENT IN TREADLES FOR SEWING AND OTHER MACHINERY.

Specification forming part of Letters Patent No. 107,921, dated October 4, 1870.

*To all whom it may concern:*

Be it known that I, GEORGE BYRON KIRKHAM, of 167 East Thirty-third street, city, county, and State of New York, have invented a new and useful Foot-Power Machine; and I do hereby declare the following to be a full, clear, and exact description of the same, sufficient to enable one skilled in the art to which the invention appertains to make use of it, reference being had to the accompanying drawing, which forms a part of this specification, and in which—

Figure 1 represents a general side view of the invention. Fig. 2 shows a front view, slightly in perspective; and Fig. 3 shows the form of the pawl and spring.

The object of this invention is to provide a convenient and reliable foot-power for such machines as hand-lathes, sewing-machines, jig-saws, and the like.

In Fig. 1 is shown, at A A, the fly-wheel or belt-wheel, and B is a ratchet-wheel which is permanently attached to it.

C is the pawl or dog, which plays in and out of the teeth $b\ b\ b$. This pawl C turns on a pivot attached to the wheel D, and rests against the face of the wheel B, being pressed against it by the spring E. (Better seen in Fig. 3.) The spring E, being fastened to the wheel D, and the friction of the pawl C against the face of B, will cause the pawl C to rise when A B goes around by its momentum in the direction of the arrow; but when the wheel D is impelled in the same direction the pawl is brought down behind one of the teeth $b\ b$, and thus gives the fly-wheel A the desired impetus. The raising of the pawl C by the friction against the face of B when A whirls around prevents the terrible clatter which results when a pawl drops from tooth to tooth of a ratchet-wheel.

It is evident that to make it useful it must be adapted to various machines; for, while a foot-lathe always has an up-and-down treadle, a sewing-machine has a rocking-treadle.

It is adapted for the foot-lathe by means of the belt F F, also seen in Fig. 2. This belt passes over the wheel D, and to prevent it from slipping has holes punched in it, which fit little pins, $d\ d$, driven into D. At the lower ends the belt has one end fastened to the treadle G, which treadle G is pivoted at its lower end, and works up and down in the usual manner, while the other end of the belt F is fastened to a stick, H, which is hinged to G, and is drawn toward it by the spring I.

When the invention is applied to a sewing-machine which has a rocking treadle, it is done by means of a cord or round belt, J J, passing over a groove in the wheel D, crossing and fastened to each end of the rocking treadle K K′, which is pivoted in the center, and has in front, at K′, a spring, L, which pulls the belt J continually taut.

Having described my invention, what I claim therein as new, and desire to secure by Letters Patent, is—

1. The arrangement of the wheel B, friction-pawl C, and spring E, arranged substantially as and for the purpose set forth.

2. The wheel D, with its accessories E and $d\ d$, and belts F and J, with the treadle H, and springs I and L, as described, and for the purpose set forth.

GEO. BYRON KIRKHAM.

Witnesses:
H. M. PAIN,
STEPHEN PAIN.